N. M. ROSENDAHL.
TIRE HOLDER.
APPLICATION FILED MAR. 14, 1918.

1,315,240.

Patented Sept. 9, 1919.

UNITED STATES PATENT OFFICE.

NILS M. ROSENDAHL, OF KENNETT SQUARE, PENNSYLVANIA.

TIRE-HOLDER.

1,315,240.  Specification of Letters Patent.  Patented Sept. 9, 1919.

Application filed March 14, 1918. Serial No. 222,500.

*To all whom it may concern:*

Be it known that I, NILS M. ROSENDAHL, a citizen of the United States of America, and resident of Kennett Square, Pennsylvania, have invented a certain new and useful Improvement in Tire-Holders, of which the following is a specification.

This invention relates to tire-holders of that kind in which a frame or body is provided for supporting the extra tire or tires at the rear of the automobile.

Generally stated, the object of this invention is to provide an improved construction and arrangement whereby a tire-holder of this general character may have other utilities and functions, in addition to its function of supporting the extra tire, and whereby it will be useful and necessary even when no extra tire is carried thereon.

It is also an object to provide certain details and features of construction and combinations tending to increase the general efficiency and desirability of a tire-holder of this particular construction.

To these and other useful ends, this invention consists in matters hereinafter set forth and claimed.

Figure 1:
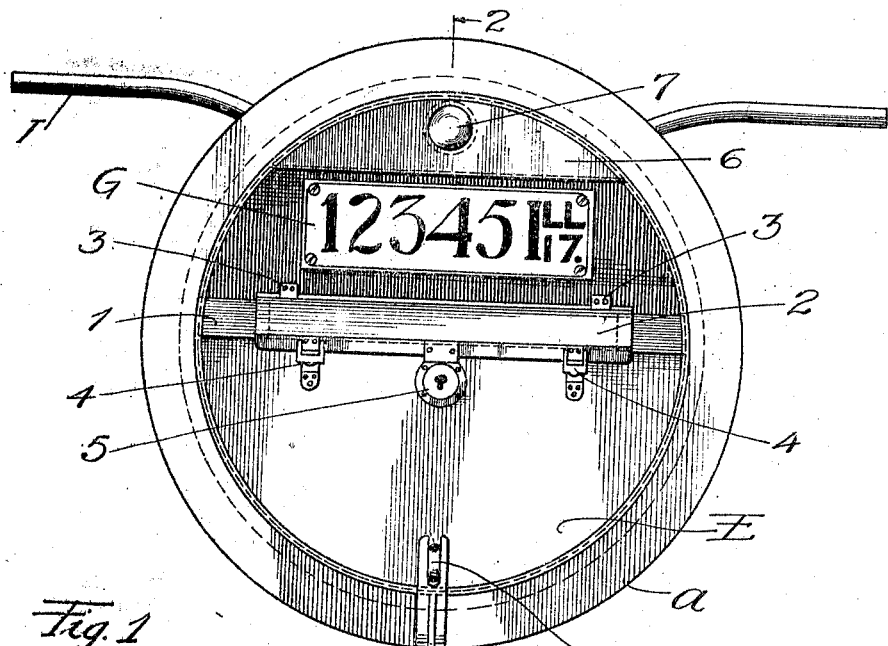
Figure 1 is a front elevation of a tire-holder embodying the principles of the invention, it being understood that in use said holder faces backward at the rear end of the automobile.
Figure 2:
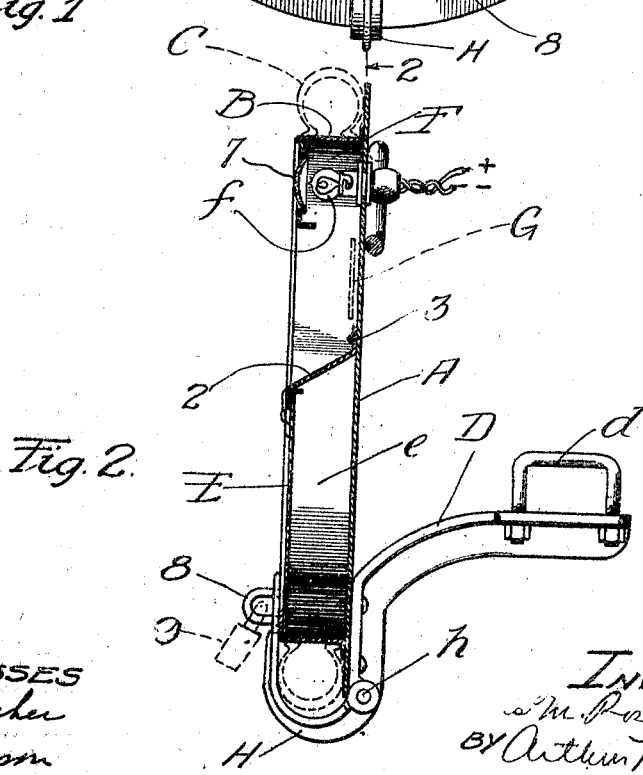
Fig. 2 is a vertical section on line 2—2 in Fig. 1.

As thus illustrated, the invention comprises a flat back A, preferably of sheet metal or other suitable material, having a circular edge *a*, and a flange B secured thereto, near the outer edge thereof. The annular flange B forms a seat for the base portion of the pneumatic tire C (shown in dotted lines in Fig. 2), when the same is properly positioned on the tire-holder. A bracket D is secured to the back of the holder, near the bottom thereof, and provided with means *d* for securing the holder in position to any convenient part or portion of the rear end of the automobile. The flange B forms a cavity in the front of the holder, and the lower portion of this cavity is inclosed by the front wall E, which extends about half way to the top of the holder, and the top of the chamber *e* thus formed is covered by fixed end-walls 1 which slope outward, and by the swinging door or cover 2 which is secured to the back A by hinges 3 of any suitable character. Fastening devices 4, of any suitable character, are provided for the front edge of the cover, to hold it down, and a lock 5 is also provided to lock the cover or door in closed position. The upper portion of the cavity in the tire-holder is partially inclosed by a front wall 6 having a red bull's-eye 7 in the center thereof, and the relatively small chamber F thus formed, is occupied by an electric lamp *f* supported in any suitable manner, and connected with a source of current on the automobile. It will be seen that the lamp *f* is directly back of the glass bull's-eye 7, so that the latter is illuminated to serve as a tail-light when the lamp is supplied with current. The license-number G occupies the space just below the chamber F, and just above the cover 2, and is secured in any suitable manner to the back wall A, whereby this number-plate is in full view when the tire-holder is supported at the rear end of the automobile. A swinging clamp H is pivoted at *h* to the lower end of the bracket D and is adapted to curve around the lower portion of the pneumatic tire and to then extend upward and bear against the front wall E, being adapted to be held in place by a padlock 9 inserted through the staple 8 on said front wall, in a manner that will be readily understood. In this way, the tire is locked upon the holder, and cannot be removed except by unlocking said padlock 9, which may be of any suitable character. The bearing I is suitably secured to the back of the holder, and may be utilized in supporting the holder at the rear end of the automobile, in any suitable or desired manner.

With the foregoing construction, it will be seen that the lamp *f* not only illuminates the bull's-eye 7, which is made of red glass to serve as a tail-light, but also fully illuminates the number-plate G directly below. Again, when the cover 2 is raised and thrown back against the number plate G, the light from said lamp will then enter the compartment or chamber *e*, so that various things may be carried in this compartment or chamber, and may be readily found therein and removed by the light of said lamp. The extra pneumatic tire can be easily removed, and is securely carried when not in use, but even aside from the function and structure of tire-holder, which is its primary purpose, it is useful and necessary for other reasons, for it is ordinarily necessary for an automobile to have a tail-light, and also a license-number-plate, so that the structure is useful and necessary even when no extra tire is carried. In addition, the structure serves as a tool-box and the lamp of the tail-light is disposed in position to illuminate the interior of said box when necessary.

Furthermore, it will be seen that the lamp $f$ is in such a position that the light thereof is thrown downward in front of the tool-box, so that the lock at 9, when raised to a position to be unlocked, will be illuminated by the light from said lamp, it being understood that the interior of the chamber F may have a reflecting surface of any suitable character.

What I claim as my invention is:

1. The combination of a body adapted to be supported in position at the rear end of an automobile, means forming a circle on the rear side of said body to engage the base portion of a pneumatic tire, so that the tire is maintained in circular form, thereby to firmly support said tire on the rear side of said body, an electric lamp supported by said body at the top of the space formed within the circle of said means, provisions coöperating with a portion of said means to form a compartment for storage below said lamp, and a device to lock the tire on said means.

2. A structure as specified in claim 1, a number-plate disposed at the rear of the space above said compartment and immediately below said lamp to be illuminated thereby, a red bull's-eye in front of said lamp, and a front wall to inclose said lamp and support said bull's-eye, said wall being supported by the outer edge of said means, said wall forming a lamp chamber which overhangs said plate and which is open at its bottom to permit insertion and removal of said lamp.

3. The structure covered by claim 2, said provisions comprising a cover for said compartment, which cover is movable into a position to permit the light from said lamp to enter said box.

4. A structure as specified in claim 1, said device comprising a pivoted latch at the bottom of said body, said lamp being so disposed that its light is directed downwardly from said space in front of said compartment, said device being disposed at the front of said compartment.

5. A structure as specified in claim 1, said means consisting of an annular flange extending outward from the face of said body, which flange is disposed a distance from the edge of said body, and said flange having an upper front wall secured thereto, with a red bull's-eye in said front wall, the electric lamp being back of said bull's-eye, a number-plate secured to said body immediately below said lamp and in position to be illuminated thereby, and a cover for said compartment, which cover is adapted to swing upward into a position to permit the light from said lamp to enter said box, the lamp chamber formed back of said first-mentioned front wall being open at the bottom thereof.

6. The combination of an automobile license number plate, a tire carrier forming a protecting cavity for said plate, and a lamp in said cavity to illuminate said plate, so that the light is reflected rearwardly and downwardly from the face of said plate.

7. A structure as specified in claim 6, and a red glass in the wall of said cavity opposite said lamp to form a tail light.

8. A structure as specified in claim 6, and a tool box formed in part by said carrier and arranged to open at its top to secure said light therein.

9. The structure covered by claim 8, in combination with a supporting arm rigid with the back of said tool box, a retaining element pivoted on said arm to hold the tire in place, and means to lock said arm to the front of said box.

Signed by me at Chicago, Cook county, Illinois, this 12th day of November, 1917.

NILS M. ROSENDAHL.